United States Patent [19]
Yoshizawa et al.

[11] Patent Number: 4,982,806
[45] Date of Patent: Jan. 8, 1991

[54] ANTI-LOCK CONTROL SYSTEM FOR MOTOR VEHICLES

[75] Inventors: Hiroyuki Yoshizawa, Iwaki; Satoru Eguchi, Kitasaitama; Haruki Shimanuki, Kasukabe; Katsuya Miyake, Konosu; Yoshiaki Hirobe, Minamisaitama, all, Japan

[73] Assignee: Akebono Brake Industry Co., Ltd., Japan

[21] Appl. No.: 486,248

[22] Filed: Feb. 28, 1990

[30] Foreign Application Priority Data

Feb. 28, 1989 [JP]  Japan .................................. 1-45190

[51] Int. Cl.⁵ ........................ B60K 31/00; B60T 8/00
[52] U.S. Cl. .................................... 180/197; 303/110; 364/426.02
[58] Field of Search ................... 180/197; 364/426.02; 303/110, 107, 108, 102

[56] References Cited

U.S. PATENT DOCUMENTS

| | | | |
|---|---|---|---|
| 4,883,325 | 11/1989 | Shimanuki et al. | 364/426.02 |
| 4,885,693 | 12/1989 | Imanaki et al. | 364/426.02 |
| 4,925,253 | 5/1990 | Swiden | 303/110 |
| 4,929,035 | 5/1990 | Shimanuki | 364/462.02 |

Primary Examiner—Mitchell J. Hill

[57] ABSTRACT

In an anti-lock control system for a motor vehicle, the design is made such that such that computed vehicle speed is prevented from remarkably departing from real vehicle speed as driving wheel slips before anti-lock control is started, thereby preventing occurrence of non-braking condition when anti-lock control is started. To this end, the manner in which the computed vehicle speed is computed, is changed between during braking operation (when anti-lock control is being effected) and non-braking operation (when no anti-lock control is being effected).

16 Claims, 8 Drawing Sheets

ANTI-LOCK CONTROL SYSTEM FOR MOTOR VEHICLES

BACKGROUND OF THE INVENTION

1. Field of the Invention

This invention relates to a novel and improved anti-lock control system for a motor vehicle, which is operative to prevent the wheels of the motor vehicle from being locked during braking operation of the motor vehicle. More particularly, the present invention is directed to an anti-lock control system which is designed to prevent occurrence of a non-braking condition when anti-lock control is started immediately after driving wheel slipped.

2. Description of the Prior Art

Generally, with an anti-lock control system for a motor vehicle, anti-lock control is effected by means of microcomputers such that hold valves and decay valves comprising electromagnetic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

To have a better understanding of the present invention, reference will first be made to FIG. 1 of the accompanying drawings, which is a block diagram illustrating the construction of a conventional four-sensor, three-channel anti-lock control apparatus, which includes left-hand front, right-hand front, left-hand rear and right-hand rear wheel speed sensors 1 to 4. Outputs of these wheel speed sensors 1 to 4 are respectively passed to computing circuits 5 to 8 from which signals representing respective wheel speeds Vw1 to Vw4 are derived. Of the four wheel speed signals, the signals representing the left-hand front wheel speed Vw1 and the right-hand front wheel speed Vw2 are transmitted to control logic circuits 9 and 10 as signals representing first and second channel speeds Vs1 and Vs2, respectively. The lower one of the left-hand rear wheel speed Vw3 and right-hand rear wheel speed Vw4 is selected in a select-low circuit 11 and is passed to a control logic circuit 12 as a signal representing a third channel speed Vs3.

The control logic circuits 9, 10 and 12 are arranged to effect "on"-"off" control of hold valves HV and decay valves DV in the respective channels on the basis of the signals representing the respective channel speeds Vs1 to Vs3 (any of these channel speeds will be referred to simply as "channel speed Vs" hereinafter).

Signals representing the wheel speeds Vw1 to Vw4 are passed to a computed vehicle speed computing circuit 13 which comprises a select-high circuit 14 and a filter circuit or limiter circuit 15. The select-high circuit 14 is arranged to provide a signal representing the highest one of the four wheel speeds Vw1 to Vw4. The filter circuit 15 is arranged to provide, as computed vehicle speed Vv resembling the real wheel speed, a signal representing a speed having an acceleration follow-up limit restricted to $+1G$ and a deceleration follow-up limit restricted to $-1G$ with respect to the highest wheel speed VwH. In this case, the computed vehicle speed Vv is set up, when a state that $Vv=VwH$ is changed to a state $Vv<VwH$ as a result of the driving wheels slipping, to increase linearly with a gradient of $+1G$ as long as the highest wheel speed VwH remains higher than the computed vehicle speed Vv. Furthermore, the computed vehicle speed Vv is set up, when Vv becomes higher than VwH, to drops linearly with a gradient of $-1G$ as long as $Vv>VwH$. The computed vehicle speed Vv set up in this way is passed to the control logic circuits 9, 10 and 12.

Pressure reduction starting point judging sections 16 to 18 are provided in the respective channels to judge a pressure reduction starting point when "on" control of the decay valves is started. The pressure reduction starting judging sections 16 to 18 are connected to output terminals of the respective control logic circuits 9, 10 and 12 through notional switches SW10, SW20 and SW30, and directly to input terminals of the control logic circuits 9, 10 and 12. The functions of the pressure reduction starting point judging sections 16, 17 and 18 will be described later.

FIG. 2 shows variations in the channel speed Vs, the acceleration/deceleration dVs/dt of the channel speed Vs, and the brake hydraulic pressure Pw in each channel of the conventional anti-lock control system shown in FIG. 1, together with hold signals HS for opening/closing the hold valves HV and decay signals DS for opening/closing the decay valves DV. Similar view is also shown in U.S. Pat. No. 4,741,580.

When the brake equipment of the motor vehicle is not being operated while the motor vehicle is running, the hold valve HV remains open while the decay valve remains closed, the brake hydraulic pressure Pw is not increased; and when the brake equipment is operated, the brake hydraulic pressure Pw is rapidly increased at time t0 so that the channel speed Vs is decreased (normal mode). A reference wheel speed Vr is set up which is lower by a predetermined amount ΔV than the channel speed Vs and follows the latter with such a speed difference. More specifically, reference wheel speed Vr is set up so that when the deceleration (negative acceleration) dVs/dt of the channel speed Vs reaches a predetermined threshold level, say $-1.1G$ at time t1, anti-lock control is started, and the reference wheel speed Vr is thereafter made to linearly decrease with a deceleration gradient $\theta$ ($= -1.1G$). At time t2 when the deceleration dVs/dt of the channel speed Vs reaches a predetermined maximum value $-Gmax$, the hold signal HS is generated so that the hold valve HV is closed, thus holding the brake hydraulic pressure Pw.

With the brake hydraulic pressure Pw being held, the channel speed Vs is further decreased. At time t3, the channel speed Vs and the reference wheel speed Vr become equal to each other, and a first cycle of anti-lock control is started; and the decay signal DS is generated, by which the decay valve DV is opened so that reduction of the brake hydraulic pressure Pw is started. As a result of this reduction of the brake hydraulic pressure Pw, the channel speed Vs is changed from decrease to increase at time t4 when a low peak VL of the wheel speed Vw occurs. The decay signal DS is interrupted either at the time t4 or at time t5 when the wheel speed Vw is increased up to the level of a speed Vb that is higher than the low peak speed VL by 15% of the difference Y between wheel speed Va occurring at the time t3 when the reduction of the brake hydraulic pressure was started and the low peak speed VL, i.e., $Vb=VL+0.15Y$ (FIG. 2 shows the case where decay signal DS is interrupted at the time t4). Thus, the decay valve DV is closed so that the reduction of the brake hydraulic pressure PW is stopped and thus the brake hydraulic pressure is held. The channel speed Vs is further increased up to the level of a speed Vc that is higher than the low peak speed VL by 80% of the difference Y between the wheel speed Va occurring at the time t3 when the reduction of the brake hydraulic pressure Pw was started and the low peak speed VL, i.e., Vc=VL+0.8Y.

Subsequently, at time t7, a high peak VH of the channel speed Vs is reached; thereupon, the brake hydraulic pressure Pw is again increased. In this case, when the difference Vv−Vs between the computed vehicle speed Vv and the channel speed Vs becomes equal to a predetermined small value ΔVo before the real high peak of the channel speed Vs occurs, this is judged as if the real high peak of the channel speed Vs were reached, and thereupon buildup of the brake hydraulic pressure Pw is started. The buildup of the brake hydraulic pressure Pw is effected in such a manner that the brake hydraulic pressure Pw is alternately increased and held in succession by the fact that the hold signal HS is turned on and off mincingly, or with relatively short intervals so that the brake hydraulic pressure Pw is caused to gradually build up. In this way, the channel speed Vs is decreased, and at time t8 (corresponding to the time t3), a second cycle of the mode for reduction of the brake hydraulic pressure occurs. The time period Tx of the initial brake hydraulic pressure buildup occurring at the time t7 is determined on the basis of calculation of the average acceleration (Vc−Vb)/ΔT over the time interval ΔT between the time t5 and the time t6 (the average acceleration depends on the friction coefficient $\mu$ of the road surface), and the time period of the subsequent pressure holding or pressure buildup is determined on the basis of the acceleration or deceleration of the channel speed Vs which is detected immediately prior to the pressure holding or pressure buildup. The brake hydraulic pressure increasing, holding and reducing modes are effected in combination as mentioned above, and thus the channel speed Vs can be controlled so that the vehicle speed can be decreased, while the wheels of the motor vehicle are prevented from being locked.

Referring again to FIG. 1, notional switches Sw10 to SW30, which are provided for operating the pressure reduction starting point judging sections 16 to 18 respectively, are turned on during the period from the time point when the deceleration of the channel speeds Vs1 to Vs3 becomes higher than −1.1G (time t1 in FIG. 2) and the time point when reduction of the brake hydraulic pressure Pw is started (time t3 in FIG. 2). In the pressure reduction starting point judging sections 16 to 18, the pressure reduction starting point is determined on the basis of comparison of the channel speed Vs and reference wheel speed Vr as mentioned above; a speed $V_{DS}$ ($V_{DS}$=Vv−ΔV′) which is lower than the computed vehicle speed Vv by a predetermined amount ΔV′ is set as pressure reduction prohibiting threshold value; and reduction of the brake hydraulic pressure Pw is prohibited when Vs>$V_{DS}$. Thus, in the sections 16 to 18, when the below-mentioned two conditions represented by equations (1) and (2) are both satisfied, this is judged as brake pressure reduction starting condition; thereupon the control logic circuits 9, 10 and 12 are caused to provide the decay signals DS.

$$Vs \leq Vr \tag{1}$$

$$Vs \leq V_{DS} \tag{2}$$

The construction and operation of the conventional anti-lock control system has been illustrated and described above by way of example. It is also possible that a speed $V_{DS}'$ having a predetermined slip ratio S with respect to the computed vehicle speed Vv may be set as pressure reduction prohibiting threshold, instead of the above-mentioned pressure reduction prohibiting threshold $V_{DS}$. The slip ratio S is defined as S=(Vv−$V_{DS}'$)/Vv; thus $V_{DS}'$=(1−S)Vv.

With such a conventional anti-lock control system, however, if the highest wheel speed VwH be rapidly increased as a result of at least one of the driving wheels slipping before anti-lock control is started, then problems will arise which will be described below.

Referring to FIG. 3, description will now be made of anti-lock control operation in the first channel when the left-hand front wheel speed Vw1 is rapidly increased as a result of the left-hand front wheel, for example, one of the driving wheels being caused to slip on a road surface having a low friction coefficient while the accelerator pedal of the running motor vehicle is being depressed.

In such a case, the highest one VwH of the four wheel speeds becomes equal to the channel speed Vs in the first channel, i.e., Vs1, and the highest wheel speed VwH is caused to rapidly increase with an acceleration gradient higher than +1G. The computed vehicle speed Vv is caused to linearly increase with an acceleration gradient of +1G under the action of the filter circuit 15; thus the computed vehicle speed Vv tends to remarkably depart upwardly from the real vehicle speed. Under such a condition, if the driver's foot is put off the accelerator pedal and thereupon the brake pedal is depressed, then the channel speed Vs (=VwH) will be rapidly decreased so that dVs/dt will reach −1.1G immediately; thus anti-lock control will be started, and subsequently the condition Vs≦Vr represented by the above equation (1) will be satisfied. Furthermore, if the highest wheel speed VwH equal to the channel speed Vs is decreased so that VwH=Vv and further decreased so that VwH<Vv, then the computed vehicle speed Vv is caused to gradually and linearly decrease with a deceleration gradient of −1G. At the same time, the channel speed Vs which is rapidly decreased, is decreased toward the real vehicle speed, and, on the way, goes below $V_{DS}$ (=Vv−ΔV′) or $V_{DS}'$ (=(1−S)Vv) so that the above condition represented by the equation (2) will be satisfied. In this way, reduction of the brake hydraulic pressure will be started, and the channel speed Vs will become substantially equal to the real vehicle speed. In contrast, the computed vehicle speed Vv will be gradually decreased with the deceleration gradient of −1G so that satisfaction of the brake pressure buildup starting condition, or occurrence of a high peak of the channel speed Vs is delayed (when the condition Vs≧Vv−ΔVo is satisfied, this is judged as occurrence of a high peak of the channel speed Vs). Thus, a non-braking condition will be permitted to persist until the above brake pressure starting condition is satisfied.

Such a tendency is remarkable with a 4WD motor vehicle.

SUMMARY OF THE INVENTION

Accordingly, it is an object of the present invention to provide an anti-lock control system for a motor vehicle, which is designed to prevent computed vehicle speed from remarkably departing from real vehicle speed as driving wheel is caused to slip immediately before anti-lock control is started, thereby preventing occurrence of non-braking condition when anti-lock control is started.

According to the anti-lock control system of the present invention, the foregoing object is achieved by changing the manner in which the computed vehicle speed is computed, between during braking operation (when anti-lock control is being effected) and non-braking operation (when no anti-lock control is being effected).

In the anti-lock control system according to the present invention, like the conventional one, the computed vehicle speed computing means comprises select-high means for selecting the highest one of the four wheel speeds $Vw1$ to $Vw4$; and means for providing, as the computed vehicle speed, a speed having acceleration and deceleration follow-up limits set at predetermined values with respect to the above-mentioned highest wheel speed $VwH$.

The computed vehicle speed computing means further comprises select-low means for selecting the lowest wheel speed $VwL$ of the four wheel speeds $Vw1$ to $Vw4$ in the case of 4WD motor vehicle; means for providing, as the computed vehicle speed $Vv$, a speed having an acceleration follow-up limit with respect to the lowest wheel speed $VwL$ set at a value lower than the acceleration follow-up limit with respect to the above-mentioned highest wheel speed $VwH$, and having a deceleration follow-up limit with respect to the lowest wheel set at a value preferably equal to the deceleraiton-side follow-up limit with respect to the above-mentioned highest wheel speed $VwH$. In this case, the computed vehicle speed $Vv$ is caused to linearly increase with an increasing gradient representing the above-mentioned acceleration follow-up limit when $Vv < VwL$, while when $Vv > VwL$, the computed vehicle speed is caused to drop linearly with a decreasing gradient representing the above deceleration follow-up limit.

Furthermore, change-over means is provided which permits the above-mentioned select-low means and associated means to be operated when the brake apparatus is not operated (when no anti-lock control is being effected) and which also permits the select-high means and associated means to be operated when the brake apparatus is being operated (when anti-lock control is being effected).

For 2WD motor vehicle, the computed vehicle speed computing means comprises select-high means for selecting the highest one of the driving and non-driving wheel speeds as in the conventional anti-lock control system; means for providing, as the computed vehicle speed $Vv$, a speed having acceleration and deceleration follow-up limits with respect to the highest wheel speed set at a predetermined value; select-high means for selecting the higher non-driving wheel speed $VwnH$ of the two non-driving wheel speeds; and means for providing, as the computed vehicle speed $Vv$, a speed having acceleration follow-up limit with respect to the highest wheel speed $VwH$ set at a value lower than the acceleration follow-up limit with respect to the highest wheel speed $VwH$ and having deceleration follow-up limit with respect to the highest wheel speed $VwH$ set at a value preferably equal to the deceleration follow-up limit with respect to the highest wheel speed $VwH$.

In this case, the computed vehicle speed $Vv$ is caused to linearly increase with an increasing gradient representing the above-mentioned acceleration follow-up limit when $Vv < VwnH$, while when $Vv > VwnH$, the computed vehicle speed $Vv$ is caused to drop linearly with a decreasing gradient representing the above deceleration follow-up limit.

Furthermore, change-over means is provided which permits the above-mentioned select-high means for non-driving wheels and associated means to be operated when the brake apparatus is not operated (when no anti-lock control is being effected) and which also permits the select-high means for the driving and non-driving wheels and associated means to be operated when the brake apparatus is being operated (when anti-lock control is being effected).

Other objects, features and advantages of the present invention will become apparent from the ensuing description taken in conjunction with the accompanying drawings.

DESCRIPTION OF THE PREFERRED EMBODIMENTS

Figure 4:
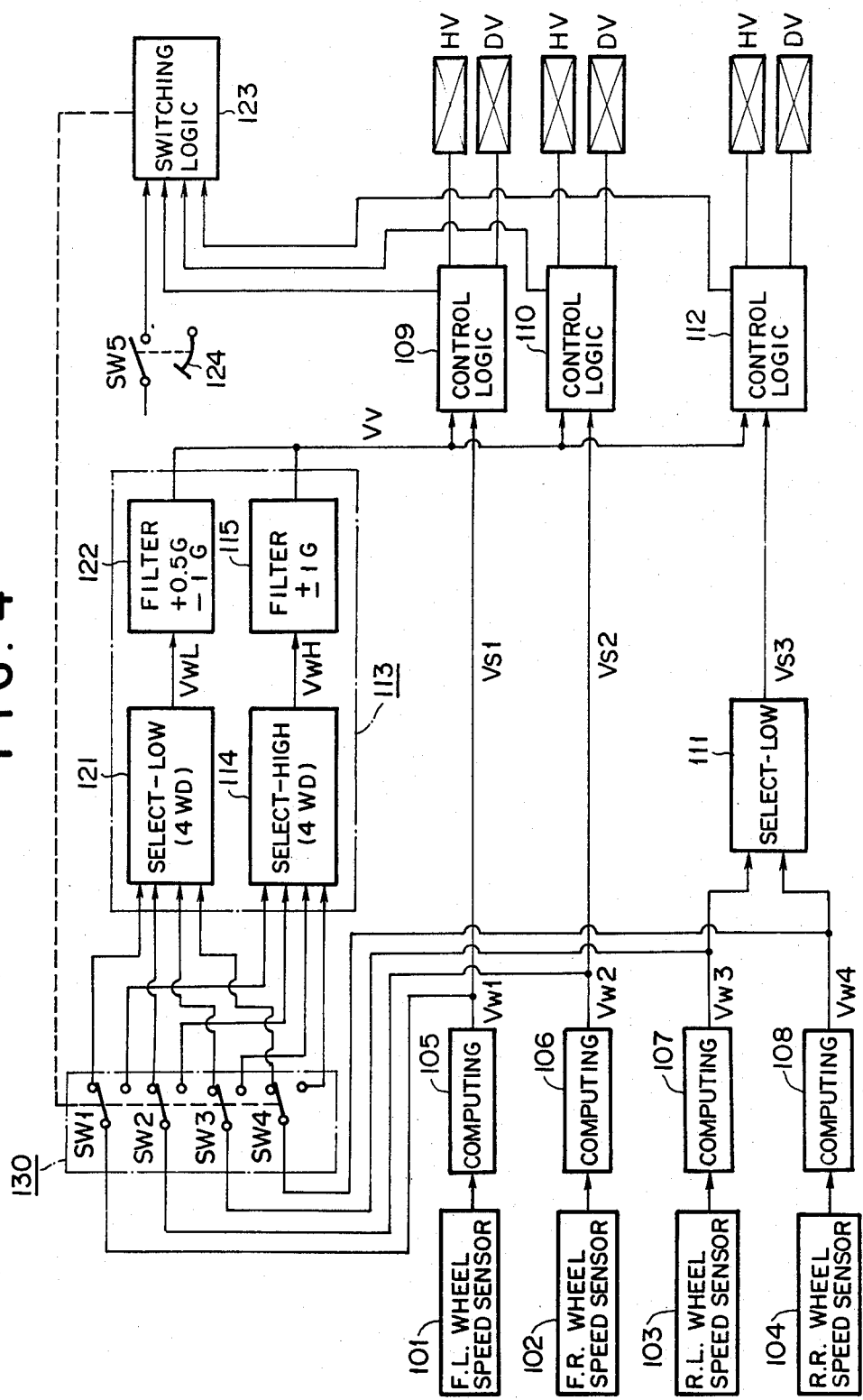
FIG. 4 is a block diagram showing the three-channel anti-lock control system for 4WD motor vehicle according to a first embodiment of the present invention.

Referring to FIG. 4, there is shown, in a block diagram, the three-channel anti-lock control system for 4WD motor vehicle according to a first embodiment of the present invention.

Figure 1:
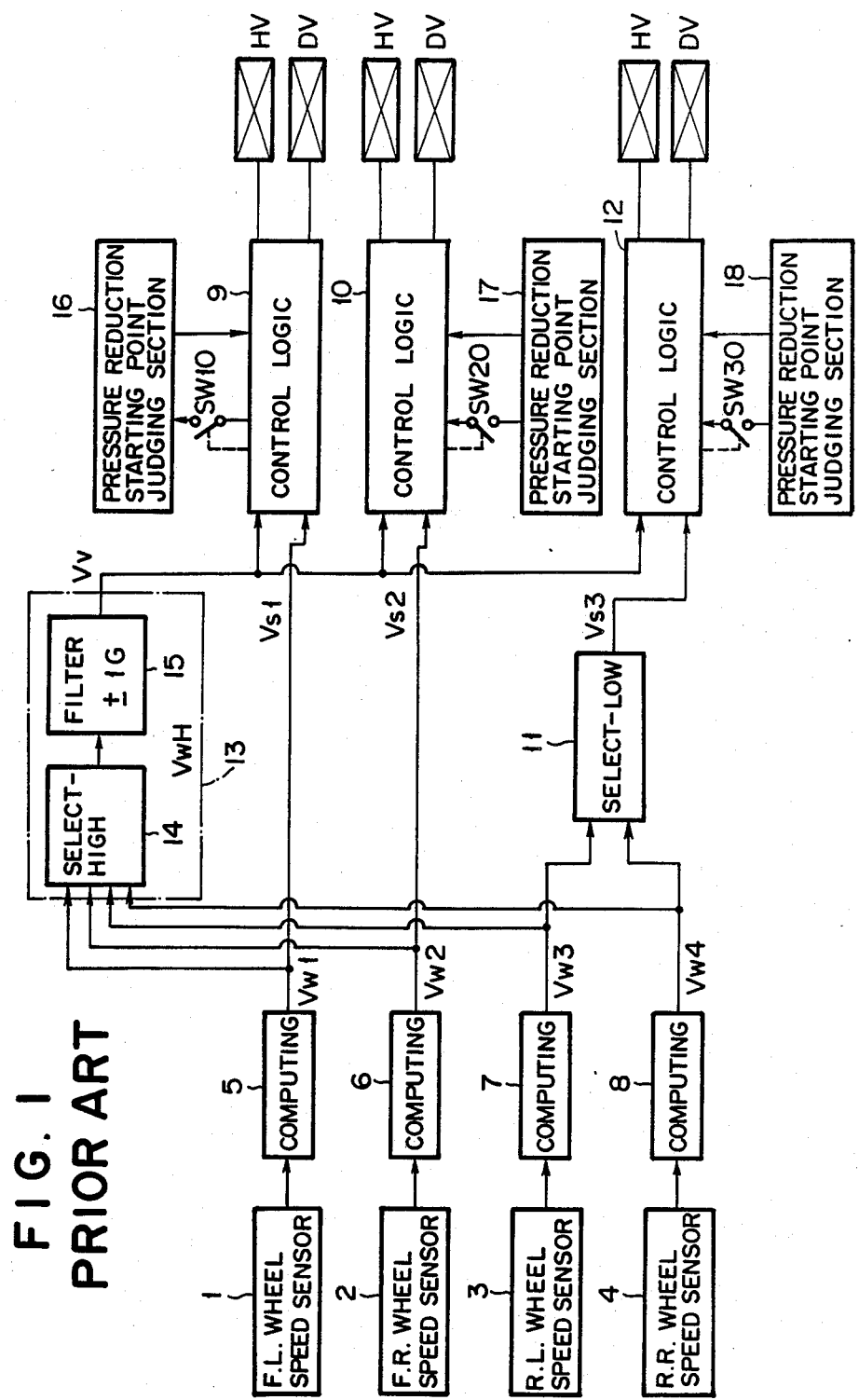
FIG. 1 is a block diagram showing a conventional three-channel anti-lock control system.

As will be noted, the anti-lock control system of FIG. 4 shares many components with the conventional system shown in FIG. 1. Therefore, parts corresponding to FIG. 1 are shown by the corresponding reference numerals in FIG. 1 plus 100, and further explanation thereof will be omitted. For the sake of simplicity of the drawings, pressure reduction starting point judging sections 16 to 18 and switches SW10 to SW30 shown in FIG. 1 are omitted in FIG. 4.

In FIG. 4, a computed vehicle speed computing circuit 113 is provided which includes a select-high circuit 114 for selecting the highest one VwH of the four driving wheel speeds Vw1 to Vw4; and a filter circuit 115 for providing, as computed vehicle speed Vv, a speed having acceleration and deceleration follow-up limits with respect to the highest wheel speed VwH, which was selected in the circuit 114, set at +1G and −1G respectively, as in FIG. 1. The computed vehicle speed computing circuit 113 further includes a select-low circuit 121 for selecting the lowest one VwL of the four wheel speeds Vw1 to Vw4; and a filter circuit 122 for providing, as the computed vehicle speed Vv, a speed having acceleration follow-up limit with respect to the lowest wheel speed VwL, which was selected in the circuit 121, set at +0.5G and also having deceleration follow-up limit with respect to the lowest wheel speed VwL set at −1G. It is to be noted that the acceleration follow-up limit (=+0.5G) set up with respect to the lowest wheel speed VwL in the filter circuit 122 is lower than the acceleration follow-up limit (=+1G) set up with respect to the highest wheel speed VwH in the filter circuit 115.

Furthermore, in the system of FIG. 4, there are provided a change-over circuit 130 including four change-over switches SW1 to SW4; and a change-over logic circuit 123 for driving the switches SW1 to SW4 all together. A brake switch SW5 adapted to be closed in response to depression of a brake pedal 124 is connected to the change-over logic circuit 123, and an output signal derived from each of the control logic circuits 109, 110 and 112 is provided thereto. When the brake apparatus is not operated or when no anti-lock control is performed, the change-over switches SW1 to SW4 have their movable contacts positioned such that four wheel speeds Vw1 to Vw4 are inputted to the select-low circuit 121; thus, the lowest one VwL of the four wheel speeds Vw1 to Vw4 is selected, and a speed having follow-up limits with respect to the lowest wheel speed VwL set at values of +0.5G and −1G respectively, is set up as the computed vehicle speed Vv.

When the brake apparatus is operated or when anti-lock control is performed, on the other hand, the change-over switches SW1 to SW4 are operated to permit the four wheel speeds Vw1 to Vw4 to be transmitted to the select-high circuit 114; thus, the highest one VwH of the four wheel speeds Vw1 to Vw4 is selected, and a speed having follow-up limits with respect to the highest wheel speed VwH set at the values +1G and −1G respectively, is set up as the computed vehicle speed Vv.

Figure 2:
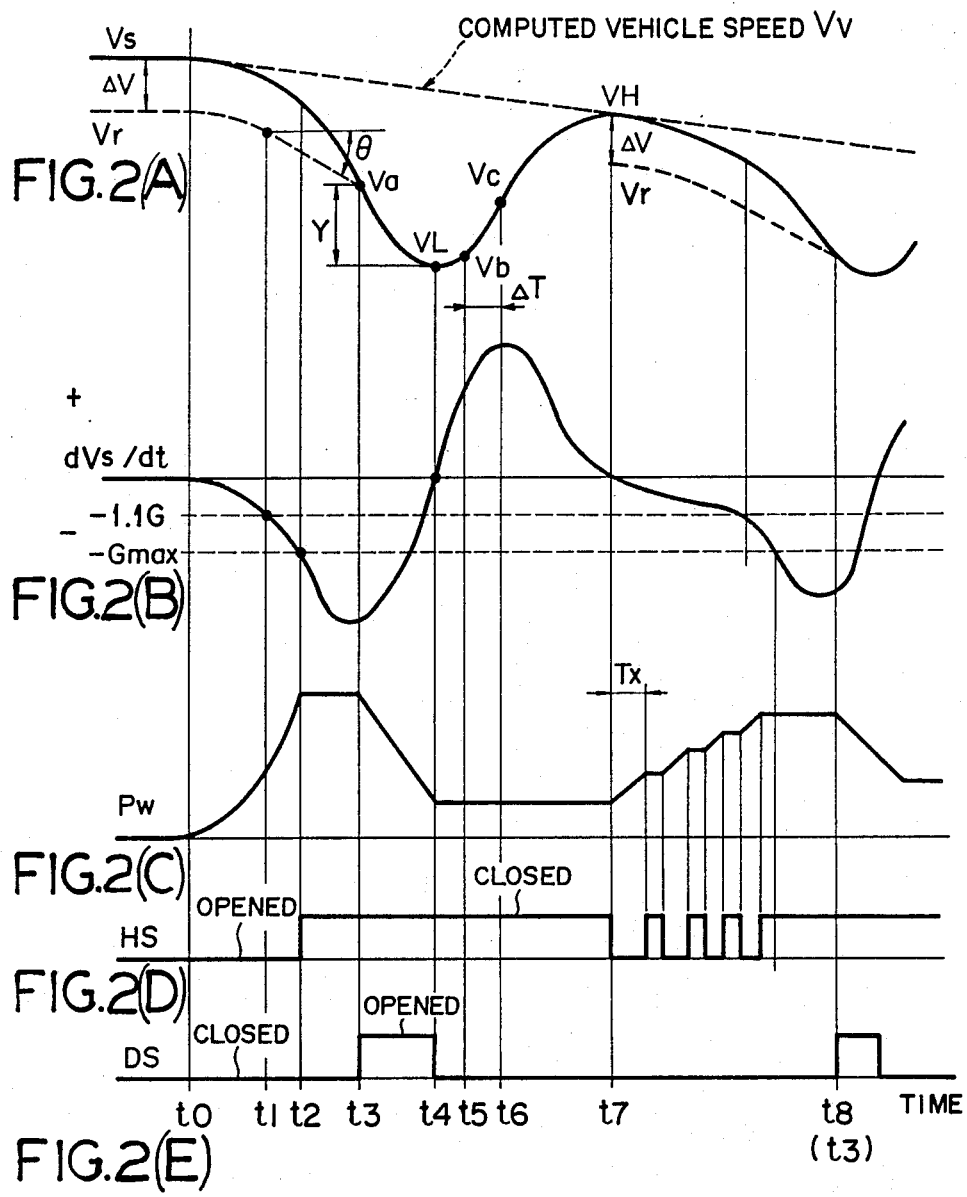
FIG. 2 is a timing chart useful for explaining anti-lock control performed in the system of FIG. 1.
Figure 3:
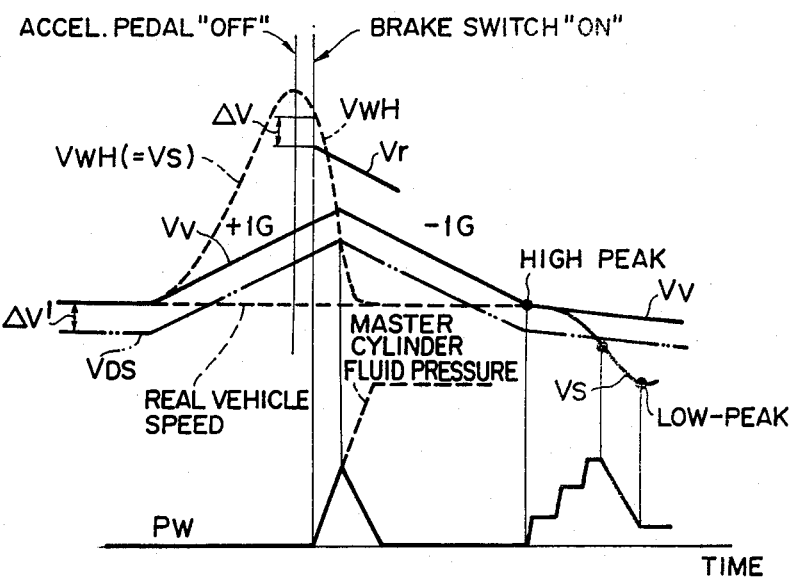
FIG. 3 is a timing chart showing a condition occurring in the system of FIG. 1 when anti-lock control is started as a result of brake apparatus being operated immediately after slip of driving wheel occurred.
Figure 5:
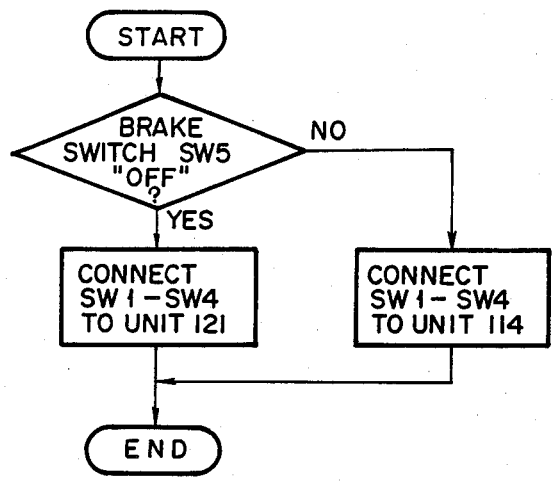
FIGS. 5 and 6 are flow charts showing change-over logic for setting up computed vehicle speed $Vv$ in the system of FIG. 4.
Figure 6:
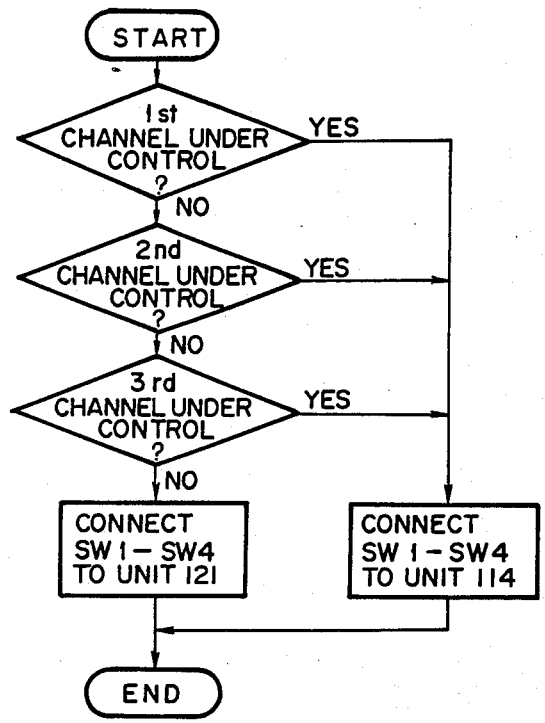

FIG. 5 shows change-over logic with which the change-over circuit 123 causes the change-over switches SW1 to SW4 to be switched in response to the change-over switch SW5 being turned on and off; and FIG. 6 shows change-over logic with which the change-over circuit 123 causes the change-over switches SW1 to SW4 to be switched in response to a signal inputted thereto from the control logic circuits 109, 110 and 112. In FIG. 6, the term "under control" refers to the condition occurring from the time t3 onward in FIG. 2.

Figure 7:
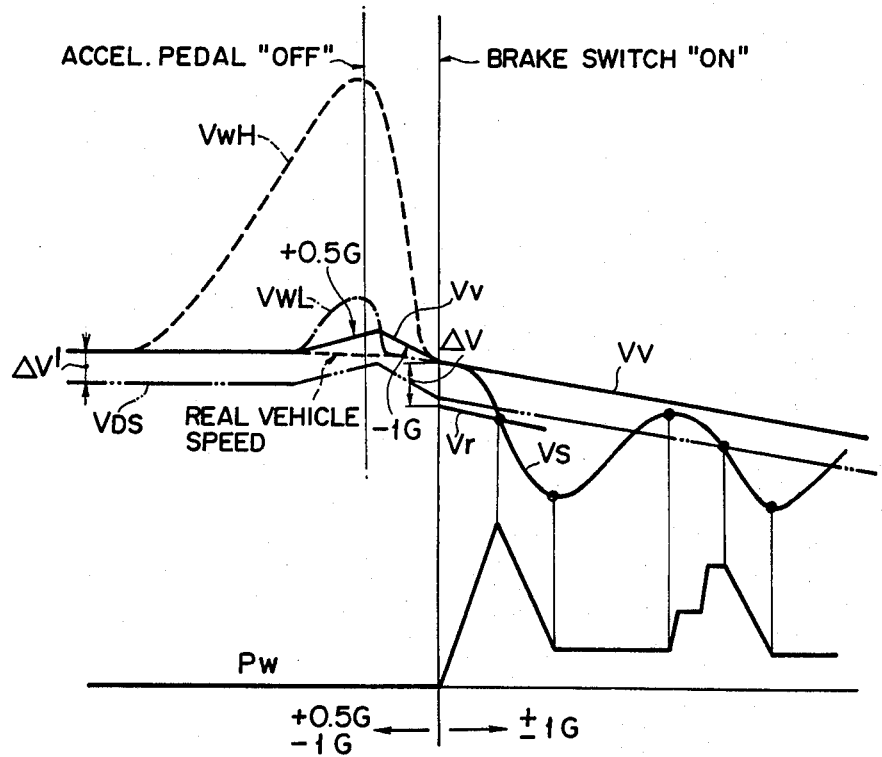
FIG. 7 is a timing chart showing a condition occurring in the system of FIG. 4 when brake apparatus is operated immediately after slip of driving wheel occurred and subsequently anti-lock control is started.

FIG. 7 is a timing chart showing the relationships between variations in the lowest one VwL of the four wheel speeds, the highest one VwH of the four wheel speeds and the channel speed Vs, and the corresponding computed vehicle speed Vv and brake hydraulic pressure Pw, which occur before and after braking operation is started, in the case where slip occurs with respect to at least one of the four wheels of 4WD motor vehicle embodying the present invention. As will be seen from FIG. 7, when the brake apparatus is not operated, the lowest one VwL of the four wheel speeds is selected; the computed vehicle speed Vv is set us as a speed having acceleration follow-up limit with respect to the lowest wheel speed VwL changed to a value, say +0.5G, that is lower than the acceleration follow-up limit of the computed vehicle speed Vv, which occurs when the brake apparatus is operated, i.e., having follow-up limits of +0.5G and −1G; and thus even in the case where the highest wheel speed VwH selected from the four wheel speeds increases greatly departing from the real wheel speed due to wheel slip occurring before braking operation is started, the computed vehicle speed Vv when braking operation is started or when anti-lock control is started is permitted to only slightly depart from the real vehicle speed, thereby eliminating the possibility that a non-braking condition tends to occur when anti-lock control is started.

Figure 8:
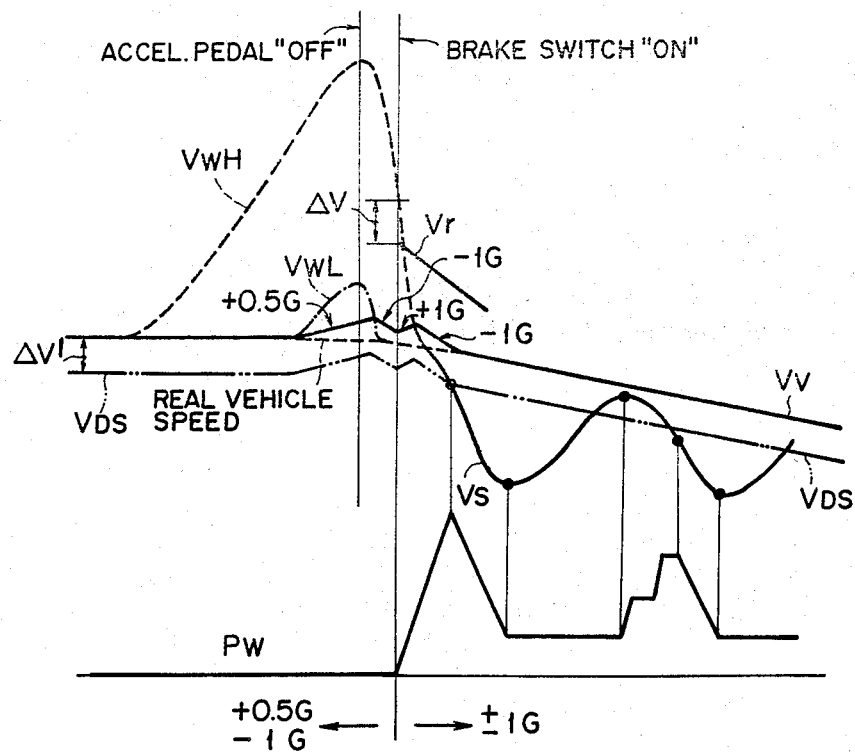
FIG. 8 is a timing chart showing a condition occurring in the system of FIG. 4 when braking operation is performed earlier than in the case of FIG. 7.

FIG. 8 is a timing chart showing variations in the computed vehicle speed Vv occurring in the case where braking operation is effected earlier than in FIG. 7.

Figure 9:
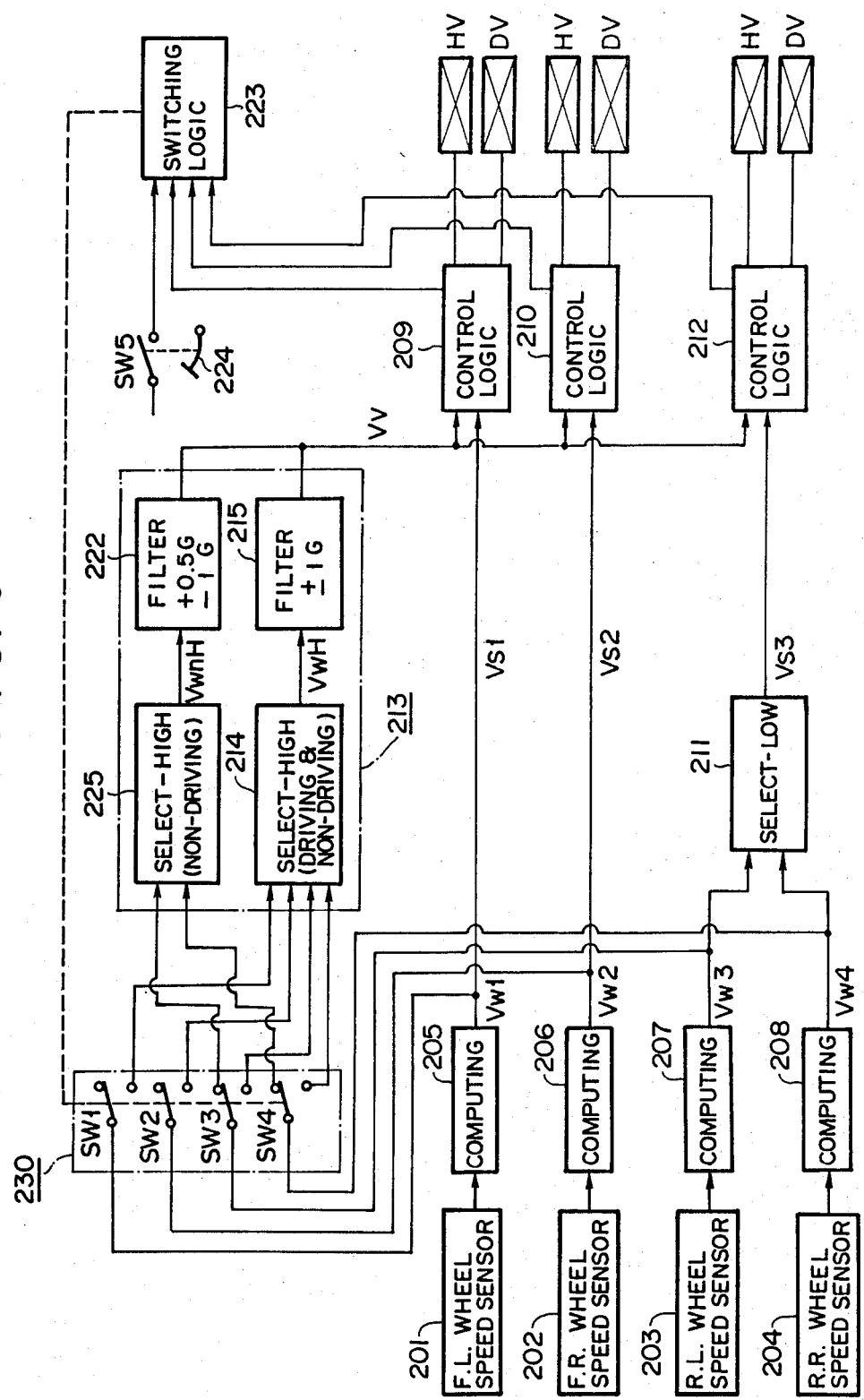
FIG. 9 is a block diagram showing the three-channel anti-lock control system for 2WD motor vehicle according to a second embodiment of the present invention.

FIG. 9 is a block diagram showing the three-channel anti-lock control system for 2WD motor vehicle according to a second embodiment of the present invention. The construction of FIG. 9 shares most of the components with FIG. 4; thus in FIG. 9, parts corresponding to FIG. 4 are indicated by the corresponding reference numerals in FIG. 4 plus 100. The arrangement of FIG. 9 is different from that of FIG. 4 in that the left-hand and right-hand rear wheels are non-driving wheels and that computed vehicle speed computing circuit 213 includes a select-high circuit 225 arranged to select the higher one VwnH of the two non-driving wheel speeds Vw3 and Vw4, instead of the select-low circuit 121 for selecting the lowest one VwL of the four driving wheel speeds Vw1 to Vw4 in FIG. 4. When the brake apparatus is not operated or when no anti-lock control is effected, a filter circuit 222 similar to the one provided in FIG. 4 provides, as computed vehicle speed Vv, a speed having follow-up limits with respect to the wheel speed VwnH (selected from the two non-driving wheel speeds) set at +0.5G and −1G respectively. More specifically, when the brake apparatus is not operated or when no anti-lock control is performed in FIG. 9, the two non-driving wheel speeds Vw3 and Vw4 are inputted to a select-high circuit 225 for non-driving wheels through change-over switches SW3 and SW4 of a switch circuit 230 respectively. When the brake apparatus is operated or when anti-lock control is performed, the four wheel speeds Vw1 to Vw4 are transmitted to a select-high circuit 214, which is arranged to select the highest one of the four wheel speeds, through change-over switches SW1 to SW4 respectively. In this way, a speed having follow-up limits with respect to the highest wheel speed VwH (selected from the four wheel speeds Vw1 to Vw4) set at +1G and −1G respectively, is set up as computed vehicle speed Vv.

Figure 10:
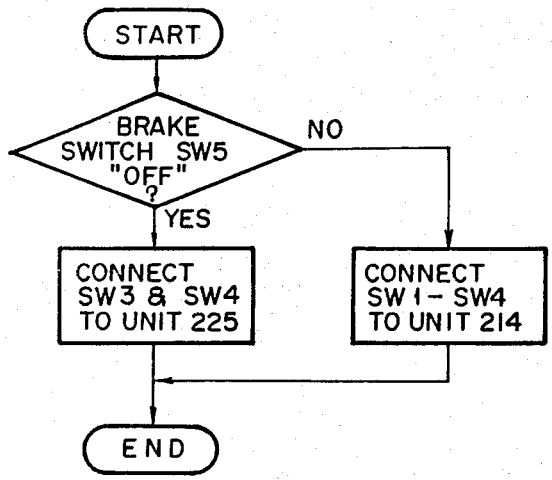
FIGS. 10 and 11 are flow charts illustrating change-over logic for setting up computed vehicle speed $Vv$ in the system of FIG. 9.
Figure 11:
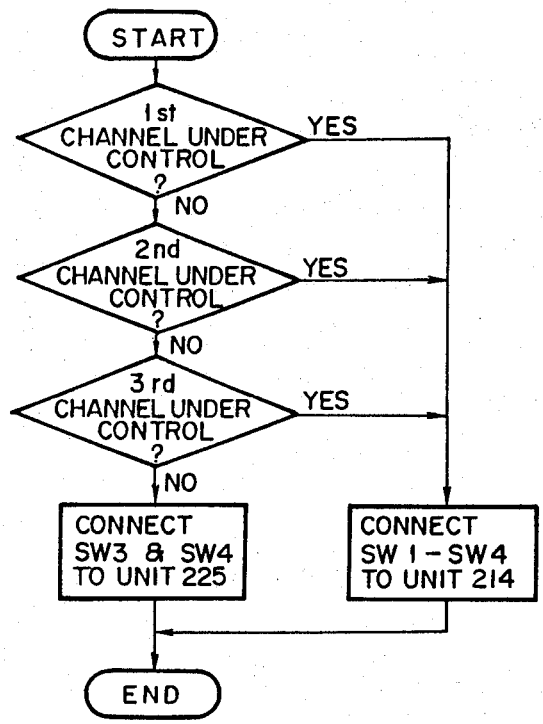

FIG. 10 shows change-over logic with which change-over logic circuit 223 permits the change-over switches SW1 to SW4 to be operated in response to brake switch SW5 being turned on and off; and FIG. 11 shows change-over logic with which the change-over logic circuit 223 permits the change-over switches SW1 to SW4 to be operated in response to a signal inputted thereto from control logic circuits 209, 210 and 212.

Figure 12:
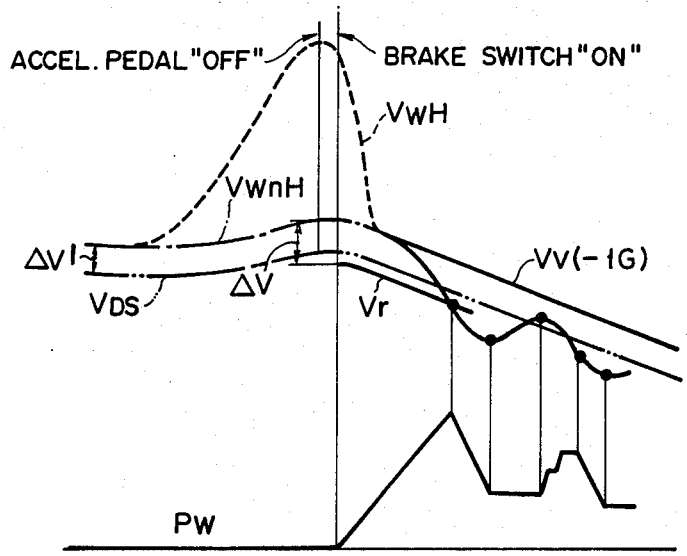
FIG. 12 is a timing chart showing a condition occurring in the system of FIG. 9 when brake apparatus is operated immediately after slip of driving wheel occurred and subsequently anti-lock control is started.

FIG. 12 is a timing chart showing the relationships between variations in the higher one VwnH of the non-driving wheel speeds, the highest one VwH of the four wheel speeds and the channel speed Vs, and the corresponding computed vehicle speed Vv and brake hydraulic pressure Pw, which occur before and after the brake apparatus is operated, in the case where slip occurs with respect to at least one of the two driving wheels of 2WD motor vehicle embodying the present invention. As will be seen from FIG. 12, when the brake apparatus is not operated, the higher one VwnH of the two non-driving wheel speeds is selected; the computed vehicle speed Vv is set up as a speed having acceleration follow-up limit with respect to the higher non-driving wheel speed VwnH changed to a value, say +0.5G, that is lower than the acceleration follow-up limit of the computed vehicle speed Vv, which occurs when the brake apparatus is operated, i.e., having follow-up limits of +1G and −1G; and thus even in the case where the highest wheel speed VwH selected from the four wheel speeds increases greatly departing from the real wheel speed due to wheel slip occurring before braking operation is started, the computed vehicle speed Vv when braking operation is started, is permitted to only slightly depart from the real vehicle speed, thereby eliminating the possibility that a non-braking condition tends to occur when anti-lock control is started.

While the present invention has been illustrated and described with respect to specific embodiments thereof, it is to be understood that the present invention is by no means limited thereto but encompasses all changes and modifications which will become possible within the scope of the appended claims.

We claim:

1. An anti-lock control system for a 4WD motor vehicle, comprising:
   a computed vehicle speed computing means (113), and means (109; 110; 112) for starting reduction of brake hydraulic pressure;
   said computed vehicle speed computing means (113) including select-high means (114) for selecting the highest one of four wheel speeds, and a first limit means (115);
   said select-high means (114) being arranged to select the highest one VwH of the four wheel speeds Vw1 to Vw4;
   said first limit means (115) being arranged to provide, as computed vehicle speed Vv, a speed having acceleration and deceleration follow-up limits with respect to the highest wheel speed VwH, selected by said select-high circuit (114), set at predetermined values;
   said computed vehicle speed Vv, which is provided by said first limit means (115) being set up so as to increase linearly with an increasing gradient representing said acceleration follow-up limit when Vv<VwH and decrease linearly with a decreasing gradient representing said deceleration follow-up limit when Vv>VwH;
   said anti-lock control system being characterized in that:
   said computed vehicle speed computing means (113) further includes select-low means (121), and a second limit means (122);
   said select-low means (121) is arranged to select the lowest one VwL of the four wheel speeds Vw1 to Vw4;
   said second limit means (122) is arranged to provide, as the computed vehicle speed Vv, a speed having acceleration and deceleration follow-up limits with respect to the lowest wheel speed VwL, selected by said select-low means (121), set at predetermined values, said second limit means (122) being also arranged such that only the acceleration follow-up limit with respect to said lowest wheel speed VwL set at a value lower than the acceleration follow-up limit with respect to said highest wheel speed VwH which is set up in said first limitr means (115);
   said computed vehicle speed Vv, which is provided by said second limit means (122), being set up so as to increase linearly with an increasing gradient representing said acceleration follow-up limit when Vv<VwL and decrease linearly with a decreasing gradient representing said deceleration follow-up limit when Vv>VwL; and
   change-over means (123; 130) are provided, said change-over means (123; 130) being arranged such that the computed vehicle speed Vv is provided by said select-low means (121) and said second limit means (122) when brake apparatus is not operated or when no anti-lock control is effected, while when the brake apparatus is operated or when anti-lock control is effected, said computed vehicle speed Vv is provided by said select-high means (114) and said first limiy means (115).

2. An anti-lock control system according to claim 1, characterized in that said first limit means (114) is arranged such that acceleration and deceleration follow-up limits of said computed vehicle speed Vv with respect to said highest wheel speed VwH are set at +1G and −1G respectively; and said second limit means (122) is arranged such that acceleration and deceleration follow-up limits of said computed vehicle speed Vv with respect to said lowest wheel speed VwL are set at +0.5G and −1G respectively.

3. An anti-lock control system according to claim 1, characterized in that said anti-lock control system is constructed in the form of three-channel configuration; left-hand front wheel speed Vw1 is channel speed Vs1 in a first channel; right-hand front wheel speed Vw2 is channel speed Vs2 in a second channel; and lower one of left-hand rear wheel speed Vw3 and right-hand rear wheel speed Vw4 is channel speed Vs3 in a third channel.

4. An anti-lock control system according to claim 1, characterized in that means (109; 110; 112) are provided for setting up, as reference speed Vr, a speed which follows channel speed Vs with a speed difference $\Delta V$ and has deceleration follow-up limit with respect to said channel speed Vs set at a predetermined value, said channel speed Vs being a control object speed in any of control channels of said anti-lock control system; for setting up, as pressure reduction starting threshold value $V_{DS}$, a speed which follows said computed vehicle speed Vv with a predetermined speed difference $\Delta V'$; and for starting reduction of the brake hydraulic pressure when a condition that $Vs \leq Vr$ and a condition that $Vs \leq V_{DS}$ are satisfied together.

5. An anti-lock control system according to claim 4, characterized in that deceleration follow-up limit of said reference speed Vr with respect to the channel speed Vs is set at $-1.1G$.

6. An anti-lock control system according to claim 1, characterized in that means (109; 110; 112) are provided for setting up, as reference speed Vr, a speed which follows channel speed Vs with a speed difference $\Delta V$ and has deceleration follow-up limit with respect to said channel speed Vs set at a predetermined value, said channel speed Vs being a control object speed in any of control channels of said anti-lock control system; for setting up, as pressure reduction starting threshold value $V_{DS}'$, a speed which follows said computed vehicle speed Vv with a predetermined slip ratio S, where the slip ratio $S=(Vv-V_{DS}')/Vv$, and thus $V_{DS}'$ is given as $V_{DS}'=Vv(1-S)$; and for starting reduction of the brake hydraulic pressure when a condition that $Vs \leq Vr$ and a condition that $Vs \leq V_{DS}'$ are satisfied together.

7. An anti-lock control system according to claim 6, characterized in that deceleration follow-up limit of said reference speed Vr with respect to the channel speed Vs is set at $-1.1G$.

8. An anti-lock control system according to claim 1, characterized in that there are provided means (109; 110; 112) for permitting buildup of the brake hydraulic pressure to be started by judging that a high peak of channel speed Vs has been reached, when the difference $Vv-Vs$ between the computed vehicle speed Vv and the channel speed Vs approaching the computed vehicle speed Vv from below has become equal to $\Delta V_o$, said channel speed Vs being a control object wheel speed in any one of control channels of said anti-lock control system.

9. An anti-lock control system for a 2WD motor vehicle, comprising:
    a computed vehicle speed computing means (213), and means (209; 210; 212) for starting reduction of brake hydraulic pressure;
    said computed vehicle speed computing means (213) including select-high means (214) for selecting the highest one of four wheel speeds, and a third limit means (215);
    said select-high means (214) being arranged to select the highest one VwH of the four wheel speeds Vw1 to Vw4;
    said third limit means (215) being arranged to provide, as computed vehicle speed Vv, a speed having acceleration and deceleration-side follow-up limits with respect to the highest wheel speed VwH, selected by said select-high circuit (214), set at predetermined values,
    said computed vehicle speed Vv, which is provided by said third limit means (215), being set up so as to increase linearly with an increasing gradient representing said acceleration follow-up limit when $Vv<VwH$ and decrease linearly with a decreasing gradient representing said deceleration follow-up limit when $Vv>VwH$;
    said anti-lock control system being characterized in that:
    said computed vehicle speed computing means (213) further includes select-high means (225), and a fourth limit means (222);
    said select-high means (225) is arranged to select the higher one VwnH of two non-driving wheel speeds;
    said fourth limit means (222) is arranged to provide, as the computed vehicle speed Vv, a speed having acceleration and deceleration follow-up limits with respect to the higher wheel speed VwnH, selected by said select-high means (225), set at predetermined values, said fourth limit (222) being also arranged such that only the acceleration follow-up limit with respect to said higher non-driving wheel speed VwnH is set at a value lower than the acceleration follow-up limit with respect to said highest wheel speed VwH is set up in said third limit means (215);
    said computed vehicle speed Vv, which is provided by said fourth limit means (222), being set up so as to increase linearly with an increasing gradient representing said acceleration follow-up limit when $Vv<VwnH$ and decrease linearly with a decreasing gradient representing said deceleration follow-up limit when $Vv>VwnH$; and
    change-over means (223; 230) are provided, said change-over means (223; 230) being arranged such that the computed vehicle speed Vv is provided by said select-high means (225) and said fourth limit means (222) when brake apparatus is not operated or when no anti-lock control is effected, while when the brake apparatus is operated or when anti-lock control is effected, said computed vehicle speed Vv is provided by said select-high means (214) and said third limit means (215).

10. An anti-lock control system according to claim 9, characterized in that said third limit means (214) is arranged such that acceleration and deceleration follow-up limits of said computed vehicle speed Vv with respect to said highest wheel speed VwH are set at $+1G$ and $-1G$ respectively; and said fourth limit means (222) is arranged such that acceleration and deceleration follow-up limits of said computed vehicle speed Vv with respect to said higher non-driving wheel speed VwnH are set at $+0.5G$ and $-1G$ respectively.

11. An anti-lock control system according to claim 9, characterized in that said anti-lock control system is constructed in the form of three-channel configuration; left-hand front wheel speed Vw1 is channel speed Vs1 in a first channel; right-hand front wheel speed Vw2 is channel speed Vs2 in a second channel; and lower one of left-hand rear wheel speed Vw3 and right-hand rear wheel speed Vw4 is channel speed Vs3 in a third channel.

12. An anti-lock control system according to claim 9, characterized in that means (209; 210; 212) are provided for setting up, as reference speed Vr, a speed which follows channel speed Vs with a speed difference $\Delta V$ and has deceleration follow-up limit with respect to said channel speed Vs set at a predetermined value, said channel speed Vs being a control object wheel speed in any of control channels of said anti-lock control system; for setting up, as pressure reduction starting threshold value $V_{DS}$, a speed which follows said computed vehicle speed Vv with a predetermined speed difference $\Delta V'$; and for starting reduction of the brake hydraulic pressure when a condition that $Vs \leq Vr$ and a condition that $Vs \leq V_{DS}$ are satisfied together.

13. An anti-lock control system according to claim 12, characterized in that deceleration follow-up limit of said reference speed Vr with respect to the channel speed Vs is set at $-1.1G$.

14. An anti-lock control system according to claim 9, characterized in that means (109; 110; 112) are provided for setting up, as reference speed Vr, a speed which follows channel speed Vs with a speed difference $\Delta V$ and has deceleration follow-up limit with respect to said channel speed Vs set at a predetermined value, said channel speed Vs being a control object speed in any of control channels of said anti-lock control system; for setting up, as pressure reduction starting threshold value $V_{DS}'$, a speed which follows said computed vehicle speed Vv with a predetermined slip ratio S, where the slip ratio $S=(Vv-V_{DS}')/Vv$, and thus $V_{DS}'$ is given as $V_{DS}'=Vv(1-S)$; and for starting reduction of the brake hydraulic pressure when a condition that $Vs \leq Vr$ and a condition that $Vs \leq V_{DS}'$ are satisfied together.

15. An anti-lock control system according to claim 14, characterized in that deceleration follow-up limit of said reference speed Vr with respect to the channel speed Vs is set at $-1.1G$.

16. An anti-lock control system according to claim 9, characterized in that there are provided means (209; 210; 212) for permitting buildup of the brake hydraulic pressure to be started by judging that a high peak of channel speed Vs has been reached, when the difference Vv−Vs between the computed vehicle speed Vv and the channel speed Vs approaching the computed vehicle speed Vv from below has become equal to $\Delta V_o$, said channel speed Vs being a control object wheel speed in any one of control channels of said anti-lock control system.

* * * * *